US008519091B2

(12) United States Patent  
Raymond

(10) Patent No.: US 8,519,091 B2
(45) Date of Patent: *Aug. 27, 2013

(54) POLYALKYLENEAMINE ADDUCTS AS CURING AGENTS FOR THICK LAYER WATER-BASED EPOXY SYSTEMS

(75) Inventor: Williams René Edouard Raymond, New Tripoli, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 11/733,407

(22) Filed: Apr. 10, 2007

(65) Prior Publication Data

US 2008/0255271 A1    Oct. 16, 2008

(51) Int. Cl.
- C08G 59/50 (2006.01)
- C08G 59/22 (2006.01)
- C09D 163/00 (2006.01)
- C08L 63/00 (2006.01)

(52) U.S. Cl.
USPC ........... 528/418; 523/402; 523/414; 523/417; 523/420; 523/427; 528/421; 528/422

(58) Field of Classification Search
None
See application file for complete search history.

(56) References Cited

U.S. PATENT DOCUMENTS

| | | | |
|---|---|---|---|
| 2,589,245 A | 3/1952 | Greenlee | |
| 3,297,519 A * | 1/1967 | Rambosek | 162/164.3 |
| 3,915,917 A | 10/1975 | Weiant et al. | |
| 4,197,389 A | 4/1980 | Becker et al. | |
| 4,608,405 A * | 8/1986 | DeGooyer | 523/404 |
| 5,382,606 A | 1/1995 | Butikofer | |
| 5,475,039 A * | 12/1995 | Butikofer | 523/404 |
| 5,527,839 A * | 6/1996 | Walker | 523/404 |
| 2004/0134163 A1 | 7/2004 | Rooshenas | |
| 2005/0120671 A1 | 6/2005 | Rooshenas | |
| 2007/0073009 A1 | 3/2007 | Sabbadini et al. | |
| 2008/0188591 A1* | 8/2008 | Raymond et al. | 523/416 |

FOREIGN PATENT DOCUMENTS

| | | |
|---|---|---|
| CS | 276 732 | 11/1990 |
| EP | 1 956 034 A1 | 8/2008 |
| GB | 1078722 | 8/1967 |
| GB | 1078723 | 8/1967 |
| JP | 06-025391 | 2/1994 |
| JP | 2000-72508 A | 3/2000 |

* cited by examiner

*Primary Examiner* — Michael J Feely
(74) *Attorney, Agent, or Firm* — Michael K. Boyer

(57) ABSTRACT

The present invention provides curing agent compositions comprising the reaction product of polyalkyleneamine compounds and polyalkylene polyether polyol modified polyepoxide resins. Amine-epoxy compositions and thick layer compositions produced from these amine-epoxy compositions are also disclosed.

22 Claims, No Drawings

POLYALKYLENEAMINE ADDUCTS AS CURING AGENTS FOR THICK LAYER WATER-BASED EPOXY SYSTEMS

BACKGROUND OF THE INVENTION

The present invention relates generally to adducted polyalkyleneamine compounds, curing agent and amine-epoxy compositions derived from such compounds, and articles produced from such compounds and/or compositions.

Epoxy resins which are cured, hardened, and/or crosslinked with amine-based curing agents are well known. These amine-epoxy materials are widely used in applications ranging from coatings, adhesives, and composites, to civil engineering applications such as formulations for concrete flooring, self-leveling flooring and grouts.

Numerous waterborne (WB) epoxy resin curing agents have been developed over the past few decades. Such curing agents can eliminate or reduce volatile organic compounds (VOCs) due to the presence of solvent in epoxy resin and hardener formulations, and the odor and environmental and health risks associated with the presence of such solvents. Many waterborne epoxy systems are also lower in viscosity than other epoxy systems, particularly 100% solids or solvent-free systems, and thus easier to apply and have level into a smooth film or layer after application.

In certain applications, it is desirable to formulate a waterborne curing agent to relatively low solids, for example, less than 40% solids, by dilution with water. Many aqueous curing agent compositions, unfortunately, cannot be diluted without causing phase separation of the formulation, which is evidenced by cloudiness in an otherwise clear formulation. Such phase separation is undesirable as it can lead to instability of the curing agent formulation during storage. In some cases, this problem can be addressed by diluting with water at the job site and only shortly before mixing the curing agent with the epoxy resin for use. In contrast to formulating a particular solids content in a controlled manufacturing environment, job-site formulating can lead to inconsistent blends and the introduction of contaminants, which can cause performance problems in the end-use application. Another method to improve the stability of the waterborne product is to add an acid, such as a carboxylic acid. Typically, this approach adversely affects the water and chemical resistance properties of the final cured product.

It is often difficult to clean equipment used for mixing and applying WB epoxy systems or tile grouts, and the use of surfactants and detergents or solvents must often be employed for satisfactory cleaning. Once the tile grout has been applied, it is advantageous to be able to clean these systems from the tiles with water alone or with a slightly acidic water solution.

BRIEF SUMMARY OF THE INVENTION

The present invention provides curing agent compositions and methods of making such compositions. These curing agent compositions can be used to cure, harden, and/or crosslink an epoxy resin. Curing agent compositions in accordance with the present invention comprise the reaction product of:
(A) at least one polyalkylene polyether polyol modified polyepoxide resin, and
(B) a polyalkyleneamine composition comprising a mixture of N-3-aminopropyl ethylenediamine (N3), N,N'-bis(3-aminopropyl) ethylenediamine (N4), and N,N,N'-tris(3-aminopropyl)ethylenediamine (N5).

In another aspect, the present invention provides a curing agent composition comprising the contact product of:
(1) the reaction product of:
 (A) at least one polyalkylene polyether polyol modified polyepoxide resin and
 (B) at least one polyalkyleneamine;
(2) at least one multifunctional amine having 2 or more active amine hydrogens, and, optionally,
(3) an acid.

Generally, curing agent compositions of the present invention have an amine hydrogen equivalent weight (AHEW) based on 100% solids from about 80 to about 500.

Aqueous or waterborne (WB) curing agent compositions are within the scope of the present invention. Such waterborne curing agent compositions comprise the above-described curing agent compositions and water. The WB curing agent compositions can be diluted to less than 40% solids, preferably to less than 20% solids, without phase separation as visible to the naked eye.

The present invention, in yet another aspect, provides amine-epoxy compositions. For example, an amine-epoxy composition in accordance with the present invention comprises the reaction product of:
a curing agent composition comprising the contact product of
 (1) the reaction product of:
  (A) at least one polyalkylene polyether polyol modified polyepoxide resin and
  (B) at least one polyalkyleneamine;
 (2) at least one multifunctional amine having 2 or more active amine hydrogens,
 and, optionally,
 (3) an acid;
and
an epoxy composition comprising at least one multifunctional epoxy resin.

As another example an amine-epoxy composition in accordance with the present invention comprises the reaction product of a curing agent composition comprising the reaction product of
(A) at least one polyalkylene polyether polyol modified polyepoxide resin, and
(B) a polyalkyleneamine composition comprising a mixture of N-3-(amino-propyl)ethylenediamine (N3), N,N'-bis(3-aminopropyl) ethylenediamine (N4), and N,N,N'-tris(3-aminopropyl)ethylenediamine (N5); and
an epoxy composition comprising at least one multifunctional epoxy resin.

Further, in another aspect the present invention provides aqueous, or WB, amine-epoxy compositions comprising the amine-epoxy compositions described immediately above and water. These waterborne amine-epoxy compositions have a fast cure rate, good chemical resistance, fast hardness development and stability when applied over cementitious substrates. The epoxy systems based on this invention can be cleaned up with water or slightly acidic water, without the use of added detergents, surfactants or solvents.

Articles of manufacture produced from amine-epoxy compositions disclosed herein include, but are not limited to, adhesives, coatings, primers, sealants, curing compounds, construction products, flooring products, or composite products, especially thick layer products such as tile grouts and self-leveling flooring compositions.

In a further aspect of the invention, tile grout compositions comprise: 5 to 15 wt % epoxy resin, 5 to 15 wt % polyamine epoxy adduct curing agent composition of the invention, 50 to 85 wt % filler, 2 to 20 wt % water (amount of water is based on total solids) and optionally 0.5 to 5 wt % additives.

In yet another aspect of the invention, a method is provided for grouting tiles comprising assembling a plurality of tiles in spaced relationship having spaces there between, applying a tile grout composition according to the invention to the spaces between the tiles, cleaning the excess tile grout composition from the tile surfaces, and allowing the tile grout composition to cure resulting in a grouted tile installation.

In a still further aspect of the invention, self-leveling flooring compositions comprise:

10 to 20 wt % epoxy resin, 10 to 20 wt % polyamine epoxy adduct curing agent composition of the invention, 50 to 75 wt % filler, 4 to 20 wt % water (amount of water is based on total solids) and optionally 0.5 to 5 wt % additives.

As yet another aspect of the invention, a method is provided for preparing a self-leveling flooring comprising applying a self-leveling flooring composition according to the invention to a substrate surface at a thickness up to about 3 cm, and allowing the self-leveling flooring composition to cure resulting in a level flooring installation.

DEFINITIONS

The following definitions and abbreviations are provided in order to aid those skilled in the art in understanding the detailed description of the present invention.

AHEW—amine hydrogen equivalent weight

Ancamine® 2655 polyamine curative comprising a mixture of N3, N4 and N5, commercially available from Air Products and Chemicals, Inc.

DETA—diethylenetriamine

EDA—ethylenediamine

EEW—epoxy equivalent weight

EO—ethylene oxide

N3—N-3-aminopropyl ethylenediamine

N4—N,N'-bis(3-aminopropyl)ethylenediamine

N5—N,N,N'-tris(3-aminopropyl)ethylenediamine

PO—propylene oxide

TEPA—tetraethylenepentamine

TETA—triethylenetetramine.

Water Soluble—the solution appears clear when viewed by the naked eye at the specified solids content, without the presence of a substantial level (>1%) of cosolvents WB—waterborne

DETAILED DESCRIPTION OF THE INVENTION

Amine and Epoxy-Amine Compositions

The present invention discloses curing agent compositions and methods of making these curing agent compositions. A curing agent composition in accordance with the present invention can be used to cure, harden, and/or crosslink an epoxy resin. Such composition comprises the reaction product of:

(A) at least one polyalkylene polyether polyol modified polyepoxide resin, and (B) a polyalkyleneamine composition comprising a mixture of N-3-aminopropyl ethylenediamine (N3), N,N'-bis(3-aminopropyl) ethylenediamine (N4), and N,N,N'-tris(3-aminopropyl)ethylenediamine (N5).

In another aspect, the present invention provides a curing agent composition comprising the contact product of:

(1) the reaction product of:
(A) at least one polyalkylene polyether polyol modified polyepoxide resin and
(B) at least one polyalkyleneamine;

(2) at least one multifunctional amine having 2 or more active amine hydrogens, and, optionally, (3) an acid, especially a carboxylic acid.

Generally, the curing agent compositions have an amine hydrogen equivalent weight (AHEW) based on 100% solids from about 80 to about 500. In a different aspect, the curing agent composition has an AHEW based on 100% solids from about 80 to about 300, or from about 80 to about 250. Further, the curing agent composition can have an AHEW based on 100% solids from about 80 to about 125.

The relative amounts of the reaction product of the at least one polyalkylene-amine and at least one polyalkylene polyether polyol modified polyepoxide resin versus that of the multifunctional amine can vary. This variance depends upon, for example, the end-use application, the desired properties, and the method and conditions used the application.

Additionally, curing agent compositions described herein can be solventless, also referred to as solvent-free or 100% solids. Alternatively, in another aspect of the present invention, these compositions can further comprise at least one diluent, such as, for example, water or an organic solvent. Appropriate organic solvents are well known to those skilled in the art of amine curative formulation chemistry.

Aqueous or waterborne curing agent compositions are within the scope of the present invention. A water-based curing agent composition comprises the contact product of the above described curing agent compositions and water. Such aqueous curing agent compositions would comprise 30 to 80 wt % solids, especially 50 to 70 wt %.

Curing agent compositions of the present invention can be produced with various reactant ratios of the modified polyepoxide resin to the polyalkyleneamine compound. It is within the scope of the present invention for the ratio of the number of stoichiometric epoxy groups (eq epoxy) in the polyalkylene polyether polyol modified polyepoxide resin to the number of moles of the at least one polyalkyleneamine to be in a range from about 0.2:1 to about 1.5:1. In another aspect, the ratio is about 0.25:1, about 0.3:1, about 0.4:1, about 0.5:1, about 0.6:1, about 0.7:1, about 0.8:1, about 0.9:1, about 1:1, about 1.1:1, about 1.2:1, about 1.3, about 1.4, or about 1.5:1. Yet, in another aspect, the ratio is in a range from about 0.3:1 to about 1.25:1, or from about 0.4:1 to about 1.2:1. Alternatively, the ratio of the number of stoichiometric epoxy groups in the polyalkylene polyether polyol modified polyepoxide resin to the number of moles of the polyalkyleneamine is in a range from about 0.5:1 to about 1.1:1. In a further aspect, the ratio is in a range from about 0.7:1 to about 1.1:1, or from about 0.9:1 to about 1.1:1.

In accordance with the present invention, a method of making a curing agent composition is provided. This method comprises adding at least one polyalkylene polyether polyol modified polyepoxide resin and at least one polyalkyleneamine compound to the other. One component, e.g., the polyepoxide resin, is added to the other slowly, over a time period generally from about 1 to about 3 hours. The reaction temperature can be between about 50° C. and about 150° C. Reaction temperature can be maintained substantially constant during the addition process. In another aspect, the reaction temperature can be between about 70° C. and about 85° C. The reaction can cause an exotherm, raising the temperature above the set point. After the addition step is complete, the temperature can be changed. The temperature after the addition step is between about 50° C. and about 150° C. Alternatively, the temperature at this stage can be between about 100° C. and about 130° C. The reaction can be allowed to continue for approximately another 30 minutes to about 2 hours to provide for a substantially complete reaction.

In another aspect of the invention, before the reaction product cools, at least one multifunctional amine is added to lower the viscosity and to target a desired AHEW for the curing agent composition. Optionally, water is added to reach a desired percent solids content for such aqueous curing agent composition.

Further, it can be beneficial for the aqueous curing agent compositions of the present invention to form single phase systems after dilution with water. For example, the present invention provides for an aqueous composition at about 20° C., wherein the curing agent composition is diluted with water to less than 40% solids to form a single phase aqueous curing agent composition. The aqueous curing agent composition is substantially free of co-solvents. Substantially free of co-solvents means that less than 1% by weight of a solvent or diluent other than water (e.g., an acid or organic solvent) is present in the aqueous curing agent formulation. Acids can be used to protonate amine groups and thereby increase the solubility of the curing agent composition in water. Non-limiting examples include carboxylic acids such as acetic acid, lactic acid, salicylic acid, and sebacic acid, or other acids such as sulfamic acid and boric acid, or combinations thereof. Salicylic acid is preferred.

Additionally, these single phase waterborne compositions or formulations are substantially clear to the naked eye. In another aspect, a single phase aqueous curing agent composition can be formed under the same conditions discussed above after dilution with water to less than 20% solids. In a further aspect, a single phase aqueous composition can be formed at about 20° C., and substantially free of co-solvents, after dilution with water to less than 10% solids.

Aqueous curing agent compositions described herein can maintain single phase uniformity for extended periods of time, which can be required for storage of the product and its subsequent use in its intended application. Additionally, if these compositions are substantially free of co-solvents, they can have substantially no VOC's, which can be beneficial for environmental, health and safety issues, as will be appreciated by those skilled in the art.

The water-based curing agent compositions also can be further modified with monofunctional epoxides, such as, for example, phenylglycidylether, o-cresylglycidyl ether, p-tert-butylphenylglycidylether, n-butylglycidylether, and other similar glycidylethers or esters. Optionally, the curing agent compositions of the present can further comprise an acid such as, for example, carboxylic acids like acetic acid, lactic acid, salicylic acid, and sebacic acid, or other acids such as sulfamic acid and boric acid, or combinations thereof. Addition of the acid functionality can increase the solubility of the curing agent composition in water. Further, curing agent compositions disclosed herein can be blended with other commercially available curing agents and/or accelerators. Such commercially available curing agents include, but are not limited to, water-based curing agents, which can be employed in a blend to target specific properties, such as cure rate, drying speed, hardness development, clarity, and gloss.

The present invention, in yet another aspect, provides amine-epoxy compositions. For example, an amine-epoxy composition in accordance with the present invention comprises the reaction product of:
a curing agent comprising the contact product of
(1) the reaction product of:
 (A) at least one polyalkylene polyether polyol modified polyepoxide resin and
 (B) at least one polyalkyleneamine;
(2) at least one multifunctional amine having 2 or more active amine hydrogens, and, optionally,
(3) a carboxylic acid; and
an epoxy composition comprising at least one multifunctional epoxy resin.

As another example an amine-epoxy composition in accordance with the present invention comprises the reaction product of a curing agent comprising the contact product of
(1) the reaction product of:
 (A) at least one polyalkylene polyether polyol modified polyepoxide resin, and
 (B) a polyalkyleneamine composition comprising a mixture of N-3-(amino-propyl)ethylenediamine (N3), N,N'-bis(3-aminopropyl) ethylenediamine (N4), and N,N,N'-tris(3-aminopropyl)ethylenediamine (N5); and
an epoxy composition comprising at least one multifunctional epoxy resin.

Further, in another aspect of the present invention, aqueous amine-epoxy compositions comprising the amine-epoxy compositions described immediately above and water are provided.

The present invention also includes articles of manufacture comprising an amine-epoxy composition as described above. Such articles can include, but are not limited to, an adhesive, a coating, a primer, a sealant, a curing compound, a construction product, a flooring composition, a self-leveling flooring composition, a grout, an anchor bolt or a composite product. Additional components or additives can be used together with the compositions of the present invention to produce the articles as are well-known to those skilled in the relevant art.

The relative amount chosen for the epoxy composition versus that of the curing agent composition, or hardener, can vary depending upon, for example, the end-use article, its desired properties, and the fabrication method and conditions used to produce the end-use article. For instance, in coating applications using certain amine-epoxy compositions, incorporating more epoxy resin relative to the amount of the curing agent composition can result in coatings which have increased drying time, but with increased hardness and improved appearance as measured by gloss. Amine-epoxy compositions of the present invention generally have stoichiometric ratios of epoxy groups in the epoxy composition to amine hydrogens in the curing agent composition ranging from about 1.5:1 to about 0.7:1. For example, such amine-epoxy compositions can have stoichiometric ratios of about 1.5:1, about 1.4:1, about 1.3:1, about 1.2:1, about 1.1:1, about 1:1, about 0.9:1, about 0.8:1, or about 0.7:1. In another aspect, the stoichiometric ratio ranges from about 1.3:1 to about 0.7:1. In yet another aspect, the stoichiometric ratio ranges from about 1.2:1 to about 0.8:1. In still another aspect, the stoichiometric ratio ranges from about 1.1:1 to about 0.9:1.

The term "contact product" is used herein to describe compositions wherein the components are contacted together in any order, in any manner, and for any length of time including the possibility that two or more of the components may react with each other yielding other components. For example, the components can be contacted by blending or mixing. Further, contacting of any component can occur in the presence or absence of any other component of the compositions or formulations described herein. Combining additional materials or components can be done by any method known to one of skill in the art. Further, the term "contact product" includes mixtures, blends, solutions, dispersions, slurries, reaction products, and the like, or combinations thereof. Although "contact product" can include reaction products, it is not required for the respective components to react with one another.

Polyalkyleneamine

Polyalkyleneamine compounds that are useful in the present invention include, but are not limited to, polyethyleneamines, polypropyleneamines, aminopropylated ethylenediamines, aminopropylated propylenediamines, and combinations thereof. Non-limiting examples of polyethyleneamines include ethylenediamine (EDA), diethylenetriamine (DETA), triethylenetetramine (TETA), tetraethylenepentamine (TEPA), pentaethylenehexamine (PEHA), and other higher polyethyleneamines. Suitable polypropyleneamines include, but are not limited to, propylenediamine, dipropylenetriamine, tripropylenetetramine, and other higher polypropyleneamines. Aminopropylated ethylenediamines and aminopropylated propylenediamines include, but are not limited to, N-3-aminopropyl ethylenediamine (N3); N,N'-bis(3-aminopropyl)ethylenediamine (N4); N,N,N'-tris(3-aminopropyl)ethylenediamine (N5); N-3-aminopropyl-1,3-diaminopropane; N,N'-bis(3-aminopropyl)-1,3-diaminopropane; and N,N,N'-tris(3-aminopropyl)-1,3-diaminopropane. Mixtures of polyalkyleneamine compounds can be employed in the present invention. It will be recognized by those skilled in the art that polyethyleneamines containing 4 or more nitrogens are generally available as complex mixtures, most of which contain the same number of nitrogens. Side products in these mixtures are often called congeners. For example, TETA contains not only linear TETA, but also tris-aminoethylamine, N,N'-bis-aminoethylpiperazine, and 2-aminoethylaminoethylpiperazine.

In one aspect of the present invention, the polyalkyleneamine compound is EDA, DETA, TETA, TEPA, PEHA, propylenediamine, dipropylenetriamine, tripropylenetetramine, N3; N4; N5; N-3-aminopropyl-1,3-diaminopropane; N,N'-bis(3-aminopropyl)-1,3-diaminopropane; N,N,N'-tris(3-aminopropyl)-1,3-diaminopropane, or any combination thereof. In another aspect, the polyalkyleneamine compound is a mixture of N3, N4, and N5 or a mixture of N-3-aminopropyl-1,3-diaminopropane; N,N'-bis(3-aminopropyl)-1,3-diaminopropane; N,N,N'-tris(3-aminopropyl)-1,3-diaminopropane. Mixtures suitable for use in the present invention generally comprise 1-25 parts by weight of N3, 50-94 parts N4, and 3-25 parts N5; preferably 1-10 parts by wt N3, 70-94 parts N4 and 3-15 parts N5; especially 1-5 parts by wt N3, 85-94 parts N4 and 3-8 parts N5. Such a mixture can be prepared by means known to those of skill in the art, via the reaction of EDA with acrylonitrile, followed by hydrogenation over a metal catalyst. Distillation or further separations of the resultant aminopropylated EDA mixture is generally not needed. Optionally, the low molecular weight side products of the reaction can be removed; these side products are typically more volatile than N3.

Polyalkylene Polyether Polyol Modified Polyepoxide

Polyalkylene polyether polyol modified polyepoxide resins (1) useful in the current invention may comprise the reaction product of:

(i) at least one polyepoxide compound and
(ii) at least one polyalkylene polyether polyol.

Suitable polyepoxide compounds and admixtures thereof are disclosed in U.S. Pat. No. 4,197,389, starting at Col 4/12, and continuing to Col 5/52. The disclosure of U.S. Pat. No. 4,197,389 is incorporated herein by reference in its entirety. In one aspect of the present invention, the at least one polyepoxide resin compound includes, but is not limited to, a diglycidyl ether of bisphenol A, a diglycidyl ether of bisphenol F, or a combination thereof. Generally, polyepoxide resin compounds with epoxy equivalent weights in the range from about 160 to about 500 are useful in the present invention.

Suitable polyalkylene polyether polyols are described in U.S. Pat. No. 4,197,389 (at Col 5/53 to Col 6/20). Non-limiting examples of polyalkylene polyether polyols that are useful in the present invention include polyethylene glycols, polypropylene glycols, or combinations thereof. Mixtures of different molecular weight polyalkylene polyether polyols can be used, as well as mixtures of different polyalkylene polyether polyols. The combinations of the different polyether polyols can be mixed first and then reacted with the polyepoxide compound, or can be reacted separately with the polyepoxide compound and subsequently mixed or blended. Generally, polyalkylene polyether polyols with number average molecular weights in the range from about 200 to 10,000, from about 400 to about 8000, from about 600 to about 5000, or from about 800 to about 2500, are useful in the present invention. The preferred alkylene oxide is ethylene oxide and the preferred polyhydric alcohol is ethylene glycol.

The polyepoxide resin compound can be reacted with the polyalkylene polyether polyol in accordance with the process described in U.S. Pat. No. 4,197,389. Often, a Lewis acid catalyst is used to promote the reaction, such as a $BF_3$-amine complex which is a well known catalyst to those of skill in the art. In addition, the reaction can be conducted in the presence of monoepoxides and solvents or softeners, as is known to those of skill in the art. Exemplary monoepoxides that can be used in admixture with the polyepoxide compound include, but are not limited to, epoxidized unsaturated hydrocarbons such as butylene, cyclohexene, and styrene oxides, and the like; halogen-containing epoxides such as epichlorohydrin; epoxyethers of monohydric alcohols such as methyl, ethyl, butyl, 2-ethylhexyl, dodecyl alcohol, and the like; epoxyethers of monohydric phenols such as phenol, cresol, and other phenols substituted in the ortho or para positions; glycidyl esters of unsaturated carboxylic acids; epoxidized esters of unsaturated alcohols or unsaturated carboxylic acids; acetals of glycidaldehyde; or combination thereof.

To produce polyalkylene polyether polyol modified polyepoxide resins useful in the present invention, the reactant ratio of epoxy groups in the polyepoxide compound to the hydroxyl groups in the polyalkylene polyether polyol is generally within a range from about 1.5:1 to about 8:1. The reactant ratio, in accordance with another aspect of the present invention, is about 1.6:1, about 2:1, about 2.5:1, about 3:1, about 3.5:1, about 4:1, about 4.5:1, about 5:1, about 5.5:1, about 6:1, about 6.5:1, about 7:1, or about 7.5:1. In yet another aspect, the reactant ratio is in a range from about 1.8:1 to about 6:1. In a further aspect, the reactant ratio of epoxy groups in the polyepoxide compound to the hydroxyl groups in the polyalkylene polyether polyol is in a range from about 2:1 to about 4:1.

In certain embodiments of the present invention, polyalkylene polyether polyol modified polyepoxide resins (2) useful in the invention may comprise a diglycidyl ether derivative of an alkoxylated diphenol containing an average of at least 1.5 epoxide groups per molecule.

Such alkoxylated diphenol epoxy resins have the following structure:

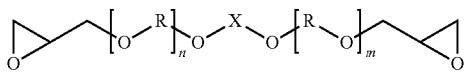

where X is an arylidene radical derived from a diphenol, R is a C2H4, C3H6 or C4H8 alkyl group, or mixture thereof, and n+m=1 to 20, preferably n+m=4 to 10. In the preferred embodiment of the invention, the diphenol is resorcinol, bisphenol-A, or bisphenol-F. These alkoxylated diphenol epoxy resins can be made generally following the procedure of Example 2. For example, one mole of the alkoxylated diphenol in a solvent such as toluene, dioxane, or n dibutyl ether as a 60 to 70% solution can be used. The materials are cooled to 10° C. When that temperature is reached the catalyst, BF3 etherate or tin tetrachloride is added followed by the addition in 10 min of epichlorohydrin. A small excess of epichlorohydrin based on stoichiometry can be used (5 to 10%). After 40 to 60 min reaction, the epoxy value should be 0 or very near 0 mgKOH/g. The temperature is increased to 25° C.; the first one-fourth of sodium hydroxide addition is added followed by a few grams of water. Temperature is then increased to 70° C. After 10 minutes the next one-fourth sodium hydroxide is added, and this is repeated until all the sodium hydroxide (1.2 moles total) is used. The reaction is then continued for another 2 hours at 70° C. whereupon water is added to dissolve the formed sodium chloride. The organic phase is separated from the water layer, which is then removed until the interlayer is reached. The remaining water and the solvent are distilled at reduced pressure and elevated temperature to afford the desired diglycidyl ether derivative of an alkoxylated diphenol diglycidyl ether derivative of an alkoxylated diphenol.

Resins (1) and (2) described above are the preferred polyalkylene polyether polyol modified polyepoxide resins for use in the present invention. Preferred polyalkylene polyether polyol modified polyepoxide resins (1) are diglycidyl ethers of bisphenol A, diglycidyl ethers of bisphenol F, or a combination thereof reacted with polyethylene polyols, polypropylene polyols or a combination thereof and preferred polyalkylene polyether polyol modified polyepoxide resins (2) are diglycidylethers resulting from the reaction of epichlorohydrin with alkoxylated bisphenols such as bisphenol-A or bisphenol-F alkoxylated with EO, PO, 1,2-BO, or tetrahydrofuran, or mixtures thereof, or diglycidylethers of alkoxylated polyphenols.

In certain embodiments of the present invention, polyglycidylethers (polyepoxides) of the present invention can be mixed with polyglycidylethers (polyepoxides) not containing polyoxyalkylene groups, such as bisphenol-A, bisphenol-F diglycidyl ether and other poly- or even monoglycidyl ethers.

Multifunctional Amine

Compositions in accordance with the present invention can comprise at least one multifunctional amine. Multifunctional amine, as used herein, describes compounds with amine functionality and which contain two (2) or more active amine hydrogens.

Non-limiting examples of multifunctional amines that are within the scope of the present invention include, but are not limited to, an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, and the like, or any combination thereof.

More than one multifunctional amine can be used in the compositions of the present invention. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethyleneamines (EDA, DETA, TETA, TEPA, PEHA, and the like), polypropyleneamines, aminopropylated ethylenediamines (N3, N4, N5, and the like), aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine, and the like, or combinations thereof. In one aspect of this invention, the multifunctional amine is EDA, DETA, TETA, TEPA, PEHA, propylenediamine, dipropylenetriamine, tripropylenetetramine, N3; N4; N5; N-3-aminopropyl-1,3-diamino-propane; N,N'-bis(3-aminopropyl)-1,3-diaminopropane; N,N,N'-tris(3-aminopropyl)-1,3-diaminopropane; or any combination thereof. Additionally, the poly(alkylene oxide) diamines and triamines commercially available under the Jeffamine name from Huntsman Corporation, are useful in the present invention. Illustrative examples include, but are not limited to, Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine, various isomers or norbornane diamine, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and the like, or combinations thereof. The mixture of methylene bridged poly(cyclohexyl-aromatic)-amines is abbreviated as either MBPCAA or MPCA, and is described in U.S. Pat. No. 5,280,091, which is incorporated herein by reference. In one aspect of the present invention, the at least one multifunctional amine is a mixture of methylene bridged poly(cyclohexyl-aromatic) amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present invention is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

It can be beneficial to limit the volatility of the specific multifunctional amine used in some applications where worker exposure and safety issues may arise. Thus, in another aspect of the present invention, the at least one multifunctional amine contains 6 or more carbon atoms. In another aspect, the at least one multifunctional amine contains 8 or more carbon atoms. In yet another aspect, the at least one multifunctional amine contains 12 or more carbon atoms.

Multifunctional Epoxy Resin

Amine-epoxy compositions of the present invention comprise the reaction product of a curing agent composition and an epoxy composition comprising at least one multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present invention comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl)propane, 2,2-bis-(4-hydroxyphenyl)-propane (commercially known as bisphenol A), bis-(4-hydroxyphenyl)-methane (commercially known as bisphenol F), and the like, or any combination thereof. Additionally, advanced dihydric phenols of the following structure also are useful in the present invention:

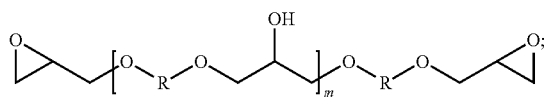

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products ranges from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEWs between 250 and 450, also generally prepared by the advancement process, are referred to as semi-solid epoxy resins because they are a mixture of solid and liquid at room temperature. Generally, multifunctional resins with EEWs based on solids of about 160 to about 750 are useful in the prevent invention. In another aspect the multifunctional epoxy resin has an EEW in a range from about 170 to about 250.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, C4 to C14 alcohols, and the like, or combinations thereof. The multifunctional epoxy resin can also be present in a solution or emulsion, with the diluent being water, an organic solvent, or a mixture thereof.

Miscellaneous Additives

Compositions of the present invention can be used in various applications. Depending on the requirements for the end-use application, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. It is understood that other mixtures or materials that are known in the art can be included in the compositions or formulations and are within the scope of the present invention.

Applications

Construction, flooring and thick layer applications include compositions comprising the amine-epoxy compositions of the present invention optionally in combination with concrete, mortar, cementitious matter or other materials commonly used in the construction industry. "Thick layer" means a coating or deposition of the composition up to about 3 cm; in certain applications 1 to 3 or 4 mm. Additional components in the thick layer compositions comprise fillers, reactive diluents, flow additives, pigments and defoamers. Aqueous compositions for thick layer applications would comprise 5 to 60 wt % water. Crack injection and crack filling products also can be prepared from the compositions disclosed herein. Amine-epoxy compositions of the present invention can be mixed with cementitious materials such as concrete mix to form polymer or modified cements, tile grouts, self-leveling floors and grouts.

Tile Grout

Another component of a grout composition is a filler which is preferably sand without Portland cement. For a colored tile grout, a color coated sand (such as ColorQuartz™ crystals from 3M) is preferred over a combination of sand and a separate pigment component. Essentially a color coated filler, such as sand, comprises a pigment attached to the sand surface. Any such color coated sand or color coated filler can be used.

In general, the nature of the sand or other filler to be used will be dictated by the intended use of the grout composition. For a typical tile grout composition, the sand will have a particle size of about 0.075 mm to 0.3 mm.

Any variety of water insoluble fillers may be used in the grout composition besides sand. Other fillers which may be imported or glass, such as crushed glass, quartz, silicone, barites, limestone, alumina and other like earthen materials such as mica, talc and the like. Sand is the preferred water insoluble filler. When the water insoluble filler is added to the grout composition, it is combined with the other ingredients of the composition and it will be disbursed or suspended.

In general, the tile grout compositions comprise 5 to 15 wt % epoxy resin, 5 to 15 wt % polyamine epoxy adduct curing agent composition of the invention, 50 to 85 wt % filler, 2 to 20 wt % water (amount of water is based on total solids) and optionally 0.5 to 5 wt % additives.

The grouting composition of the present invention may be applied by any method known in the art including a trowel, rubber float, squeegee, or cartridge and dispenser.

The grout composition may be used to grout a large variety of ceramic surfaces, including non-skid surfaces, smooth surfaces, and the like. The tiles will normally be ceramic tiles, but may also be marble, granite, limestone, mason block, and stone. In general, any ceramic surface requiring a grout can be used with the grout composition of the present invention.

A method for grouting tiles with the grout comprises
assembling a plurality of tiles in spaced relationship having spaces there between,
applying a tile grout composition to the spaces between the tiles, wherein the tile grout composition is according to the present invention, and
cleaning the excess tile grout composition from the tile surfaces, and
allowing the tile grout composition to cure resulting in a grouted tile installation.

Self-Leveling Flooring Composition

Self-leveling flooring compositions comprise 10 to 20 wt % epoxy resin, 10 to 20 wt % polyamine epoxy adduct curing agent composition of the invention, 50 to 75 wt % filler, 4 to 20 wt % water (amount of water is based on total solids) and optionally 0.5 to 5 wt % additives. The fillers including sand described for tile grouts are suitable for self-leveling flooring compositions.

A method for preparing a self-leveling flooring comprises
applying a self-leveling flooring composition according to the invention to the surface of a substrate, such as concrete, metal or wood, at a thickness up to about 3 cm, and
allowing the self-leveling flooring composition to cure resulting in a level flooring installation.

Example 1

Synthesis of Polyalkylene Polyetherpolyol Modified Polyepoxide Resin A 1

379 g of polyethylene glycol 1000 (0.758 equivalents OH) and 490 g of a bisphenol-A diglycidyl ether having an EEW of 190 (2.58 equivalents epoxy) were charged to a stirred reactor equipped with a thermocouple and a reflux condenser. The ratio of epoxy groups or epoxy equivalents in the polyepoxide compound to hydroxyl groups in the polyol was 3.4:1. 3 grams of Anchor® 1040 $BF_3$-amine catalyst were then added to the reactor. While the reactor contents were stirred, the reactor temperature was increased to 170° C. This temperature was maintained until the epoxy equivalent weight increased to about 475 to 500. The reactor contents were then cooled, resulting in a reaction product designated as Resin A1. The EEW of Resin A1 was 498 and the viscosity at 40° C. was 33 Poise (3.3 Pa-s).

Example 2

Synthesis of Polyalkylene Polyetherpolyol Modified Polyepoxide Resin A2

In a glass, double walled 1.2 liter stirred reactor of fitted with a thermometer, a refluxing cooler and a 125 ml dropping funnel were charged 369.6 g (0.558 mole) of Dianol 372® propoxylated bisphenol A (7.2 PO) and 120 g n-dibutylether. The cooling aggregate connected to the reactor was set at 10° C., and the charged raw materials were cooled down. At 10° C. 1.5 g BF3 etherate were introduced, followed by the addition in five to ten minutes of 110 g (1.19 moles) epichlorohydrin and react for about 40 min. When the epoxy value was 0 mgKOH/g, the reaction was complete. The reaction was brought to 25° C. and 12.4 g (0.31 mole) solid sodium hydroxide was added followed by 3 g water. The temperature was increased to 70° C. After 10 minutes another 12.4 g (0.31 mole) sodium hydroxide was added. The sodium hydroxide additions were repeated 10 minutes later and again after another 10 minutes. In total 4×12.4 g sodium hydroxide was added. The reaction was continued for another 2 hr at 70° C. 400 g water were then added and mixed thoroughly with the reactants to dissolve all the produced NaCl. The water layer was left to separate from the organic phase and was then removed until the interlayer is reached?. Pressure was slowly reduced to 20 mbar, the temperature increased to 120° C., and the remaining water and n-dibutylether were removed (132 g are collected). Product (450 g of resin) was collected on a 20 micrometer filter. 112.5 g (20%) Epon® 828 diglycidyl ether of bisphenol A epoxy resin was added to the resin to complete resin A2 which had an EEW of 728 and a viscosity @ 40° C. of 1200 poise.

Example 3

Modified Polyepoxide Resin/Polyalkyleneamine Adduct 1

Ancamine 2655® curing agent (175 g; 1 mole) in a 700 ml flanged reactor, fitted with a thermocouple, stirrer, reflux condenser and a 500 ml dropping funnel was heated to 80° C. Resin A2 (364.2 g; 0.5 mole) was added over 1.5 hours, ensuring the temperature did not go above 90° C. When the addition was completed, the temperature was increased to 120° C. and maintained 1 hour. After cooling the product had an AHEW of 106, an amine value of 396 mgKOH/g and a viscosity @ 25° C. of 4968 cP (mixed 70% in Dowanol PM® solvent).

Example 4

Modified Polyepoxide Resin/Polyalkyleneamine Adduct 2

Triethylenetetramine (155 g; 1 mole) in a 700 ml flanged reactor, fitted with a thermocouple, stirrer, reflux condenser and a 500 ml dropping funnel was heated 70° C. Resin A2 (364.2 g; 0.5 mole) was added over 1.5 hours, ensuring the temperature did not go above 90° C. When the addition was completed, the temperature was increased to 120° C. and maintained 1 hour. After cooling the product had an AHEW of 102.

Example 5

Modified Polyepoxide Resin/Polyalkyleneamine Adduct 3

Ancamine 2655® curing agent (175 g; 1 mole) in a 700 ml flanged reactor, fitted with a thermocouple, stirrer, reflux condenser and a 500 ml dropping funnel was heated to 70° C. Resin A1 (498 g; 0.5 mole) was added over 1.5 hours, ensuring the temperature did not go above 90° C. When the addition was completed, the temperature was increased to 120° C. and maintained 1 hour. After cooling the product had an AHEW of 135, an amine value of 319 mgKOH/g and a viscosity @ 25° C. of 10900 cP (mixed 70% in Dowanol PM® solvent).

Example 6

Adduct/Multifunctional Amine/Carboxylic Acid Formulation (1)

Adduct A1 (265.7 g) was charged to a 1 liter glass reactor fitted with a thermocouple, a reflux condenser, and a stirrer and heated to 80° C. 58.3 g (0.25 mole) Benzylated DETA/TETA (70/30; benzylated at 1.3/1.0) were added in 5 minutes and stirred for 10 minutes until homogeneous and clear. Water (324 g) was added slowly in 15 minutes so as not to cool the mixture too fast and stop the product diluting in the water. Finally, 6.5 g (2% based on solids) salicylic acid were added and stirred until all the salicylic acid was dissolved. The resulting formulation at 50.5% solids had AHEW=190; amine value=222.9 mgKOH/g; and viscosity @ 25° C.=1593 cp.

Example 7

Adduct/Multifunctional Amine/Carboxylic Acid Formulation (2)

Adduct A1 (265.7 g) was charged to a 1 liter glass reactor fitted with a thermocouple, a reflux condenser, and a stirrer and heated to 80° C. Meta-xylylene diamine (mXDA; 58.3 g; 0.25 mole) was added in 5 min and stirred for 10 min until homogeneous and clear. Water (299.7 g) was added slowly in 15 minutes so as not to cool the mixture too fast and stop the product diluting in the water. Finally, 6.0 g (2% based on solids) salicylic acid were added and stirred until all the salicylic acid was dissolved. The resulting formulation at 50.5% solids had AHEW=173; amine value=222.9 mgKOH/g; and viscosity @ 25° C.=1593 cp.

Example 8

Adduct/Multifunctional Amine/Carboxylic Acid Formulation (3)

Adduct A1 (265.7 g) was charged to a 1 liter glass reactor fitted with a thermocouple, a reflux condenser, and a stirrer and heated to 80° C. Isophorone diamine (IPDA; 42.8 g; 0.25 mole) was added in 5 min and stirred for 10 min until homogeneous and clear. Water (324 g) was added slowly in 15 minutes so as not to cool the mixture too fast and stop the product diluting in the water. Finally, 6.2 g (2% based on solids) salicylic acid were added and stirred until all the salicylic acid was dissolved. The resulting formulation at 50.5% solids had AHEW=178; amine value=220 mgKOH/g; and viscosity @ 25° C.=1394 cp.

Example 9

Adduct/Multifunctional Amine/Carboxylic Acid Formulation (4)

Adduct A1 (265.7 g) was charged to a 1 liter glass reactor fitted with a thermocouple, a reflux condenser, and a stirrer and heated to 80° C. Diethylenetriamine/phenylglycidyl ether adduct (DETA/PGE adduct; 80 g; 0.25 mole) was added in 5 min and stirred for 10 min until homogeneous and clear. Water (345.7 g) was added slowly in 15 minutes so as not to cool the mixture too fast and stop the product diluting in the water. Finally, 6.9 g (2% based on solids) salicylic acid were added and stirred until all the salicylic acid was dissolved. The resulting formulation at 50.5% solids had AHEW=199; amine value=156.5 mgKOH/g; and viscosity @ 25° C.=1480 cp.

Example 10

Adduct/Multifunctional Amine/Carboxylic Acid Formulation (5)

Adduct A2 (255.7 g) was charged to a 1 liter glass reactor fitted with a thermocouple, a reflux condenser, and a stirrer and heated to 80° C. Isophorone diamine (IPDA; 42.8 g; 0.25 mole) was added in 5 min and stirred for 10 min until homogeneous and clear. Water (298.5 g) was added slowly in 15 minutes so as not to cool the mixture too fast and stop the product diluting in the water. Finally, 6.0 g (2% based on solids) salicylic acid were added and stirred until all the salicylic acid was dissolved. The resulting formulation at 50.5% solids had AHEW=172; amine value=132 mgKOH/g; and viscosity @ 25° C.=2871 cp.

Example 11

Adduct/Multifunctional Amine/Carboxylic Acid Formulation (6)

Adduct A3 (337.5 g) was charged to a 1 liter glass reactor fitted with a thermocouple, a reflux condenser, and a stirrer and heated to 80° C. Isophorone diamine (IPDA; 42.8 g; 0.25 mole) was added in 5 min and stirred for 10 min until homogeneous and clear. Water (380.3 g) was added slowly in 15 minutes so as not to cool the mixture too fast and stop the product diluting in the water. Finally, 7.6 g (2% based on solids) salicylic acid were added and stirred until all the salicylic acid was dissolved. The resulting formulation at 50.5% solids had AHEW=219; amine value=130 mgKOH/g; and viscosity @ 25° C.=5453 cp.

Evaluation as Tile Grouts

SpectraLock® tile grout formulation from Laticrete International, Inc. was used as comparative example. The resin system from the SpectraLock formulation and filler commercially sold by Laticrete were used with the curing agents of the present invention.

Before application the curing agent-containing tile grout formulations were diluted to 35% solids. The tile grout formulations shown in Table 1 were applied. The amounts of curing agent formulations, Laticrete epoxy resin (EEW=265) and Laticrete filler are in parts by weight. The HEW for each curing agent composition is also shown.

All the curing agents formulations 1-6 gave clear solutions at RT and 50 or 35% solids. These curing agent solutions were also stable for 3 months and more.

The following tests were conducted on the tile grout formulations 1-6 with the results shown in Table 2:
- Shore D—Measured using a Shore D hardness instrument (ASTM D 2240). Values were collected after 6, 8, 24, 72 and 168 hours. The value noted was the average of 5 to 10 measurements.
- UV resistance—The yellowing index was measured at various intervals after exposure of the grout to UV in damp and dry cycles. Yellowing index (Yi) was measured after 1, 7, 24, 52, 168, 216, and 360 hours.
- Formulation spreadability—Ease of application with a rubber squeegee.
- Formulation clean-up—The excess tile grout was removed using a vinegar dilution (at 50 ml/gallon). The ease of the removal was noted. Cleaning was done 1 hour after application.

The shore D measurements show that the curing agents according to the invention improve the early hardness development of the tile grout system. The ultimate shore D after 7 days seemed to converge towards values in the range of 60 to 75. Formulation 5 which is based on TETA had a slow hardness development.

UV exposure showed that most of the system were marginally the same none stood out as better but also none were worst that the existing systems.

Spreadability was the same for all the systems, it felt good and easy to do. The penetration in the joints (3 mm wide) was very good. No difference was noticed between the systems.

Clean-up was also very similar in all cases using 50 ml vinegar/gallon water showing it to be a very efficient method to remove and clean the excess grout. Using pure water was more difficult and tended to smudge the sponge. The use of soapy water was also very useful but not as efficient as the vinegar-water.

TABLE 1

| | Tile Grout | | | | | | |
|---|---|---|---|---|---|---|---|
| | 1 | 2 | 3 | 4 | 5 | 6 | Laticrete |
| | | | | Curing Agent Formulation | | | |
| | 1 | 2 | 3 | 4 | 5 | 6 | Laticrete |
| AHEW @ 35% | 271 | 247 | 254 | 284 | 246 | 313 | |
| Curing Agent | 142 | 135 | 137 | 145 | 135 | 152 | 140 |
| Epoxy resin | 138 | 145 | 143 | 135 | 145 | 128 | 140 |
| Filler | 1100 | 1100 | 1100 | 1100 | 1100 | 1100 | 1100 |

TABLE 2

| | Hours | 1) | 2) | 3) | 4) | 5) | 6) | Laticrete ® |
|---|---|---|---|---|---|---|---|---|
| Shore D | 6 | 25 | 30 | 30 | 30 | 10 | 45 | 15 |
| | 8 | 30 | 40 | 50 | 35 | 10 | 50 | 20 |
| | 24 | 55 | 60 | 65 | 60 | 30 | 68 | 70 |
| | 72 | 60 | 65 | 70 | 60 | 40 | 70 | 75 |
| | 168 | 60 | 65 | 70 | 60 | 50 | 75 | 75 |
| | Time hrs | 1) | 2) | 3) | 4) | 5) | 6) | Laticrete ® |
| UV exposition Yellow Index (Yi) | 1 | 1.33 | 0.42 | 1.35 | 3.77 | 1.21 | 1.29 | 1.72 |
| | 7 | 7.61 | 5.44 | 6.64 | 10.06 | 6.07 | 11.27 | 4.46 |
| | 24 | 12.48 | 11.02 | 10.2 | 14.25 | 10.55 | 16.63 | 6.65 |
| | 52 | 18.98 | 14.88 | 13.96 | 19.67 | 13.06 | 19.84 | 10.67 |
| | 168 | 30.36 | 30.71 | 26.54 | 27.67 | 20.09 | 28.77 | 20.16 |
| | 216 | 30.94 | 34.3 | 29.4 | 29.17 | 23.6 | 30.3 | 26.26 |
| | 360 | 34.4 | 33.32 | 34.02 | 31.85 | 28.05 | 32.01 | 33.73 |
| | 1) | 2) | 3) | 4) | 5) | 6) | Laticrete ® | |
| Spreadability | easy spreadability | easy spreadability | easy spreadability | easy spreadability | easy spreadability | easy spreadability | easy spreadability | |
| | 1) | 2) | 3) | 4) | 5) | 6) | Laticrete ® | |
| Cleanability Water + Acetic acid. Cleaned after 1 hour | easy to clean; nice surface | easy to clean; nice surface | easy to clean; nice surface | easy to clean; nice surface | easy to clean; nice surface | easy to clean; nice surface | easy to clean; nice surface | |

I claim:

1. A curing agent composition comprising the reaction product of:
   (A) at least one polyalkylene polyether polyol modified polyepoxide resin; and
   (B) a polyalkyleneamine composition comprising a mixture of N-3-aminopropyl ethylenediamine (N3), N,N'-bis(3-aminopropyl)ethylenediamine (N4), and N,N,N'-tris(3-aminopropyl)ethylenediamine (N5).

2. The curing agent composition of claim 1, wherein the at least one polyalkylene polyether polyol modified polyepoxide resin comprises the reaction product of: a polyepoxide compound; and a polyalkylene polyether polyol, a diglycidyl ether derivative of an alkoxylated diphenol, or a combination thereof.

3. The curing agent of claim 1, wherein the polyalkyleneamine composition comprises 1-25 parts by weight of N3, 50-94 parts by weight N4, and 3-25 parts by weight N5.

4. The curing agent of claim 1, wherein the at least one polyether polyol modified polyepoxide resin comprises alkoxylated diphenol epoxy resins having the following structure:

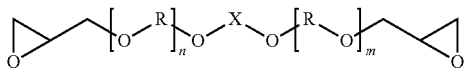

where X is an arylidene radical derived from a diphenol, R is a C2H4, C3H6 or C4H8 alkyl group, or mixture thereof, and n+m=1 to 20.

5. The curing agent of claim 1, wherein the at least one polyalkylene polyether polyol modified polyepoxide resin comprises the reaction product of: a polyepoxide compound which is a diglycidyl ether of bisphenol A, a diglycidyl ether of bisphenol F, or a combination thereof; and a polyalkylene polyether polyol which is a polyethylene glycol, a polypropylene glycol, or a combination thereof.

6. An epoxy curing agent composition comprising the contact product of:
   (1) the reaction product of: (A) at least one polyalkylene polyether polyol modified polyepoxide resin; and (B) at least one polyalkyleneamine; and
   (2) at least two multifunctional amines having 2 or more active amine hydrogens;
   wherein at least one of the at least two multifunctional amines comprises an aliphatic amine;
   wherein the at least one polyalkylene polyether polyol modified polyepoxide resin comprises alkoxylated diphenol epoxy resins having the following structure:

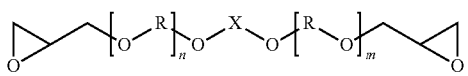

where X is an arylidene radical derived from a diphenol, R is a C2H4, C3H6 or C4H8 alkyl group, or mixture thereof, and n+m=1 to 20; and
   wherein the ratio of the number of stoichiometric epoxy groups in the at least one polyalkylene polyether polyol modified polyepoxide resin to the number of moles of the at least one polyalkyleneamine ranges from about 0.2:1 to about 1.5:1.

7. The curing agent of claim 6, wherein the at least one polyalkyleneamine comprises 1-25 parts by weight of N-3-aminopropyl ethylenediamine (N3), 50-94 parts by weight N,N'-bis(3-aminopropyl)ethylenediamine (N4), and 3-25 parts by weight N,N,N'-tris(3-aminopropyl)ethylenediamine (N5).

8. The curing agent of claim 6, wherein one of said at least two multifunctional amines comprises an aliphatic amine; and wherein the other multifunctional amine(s) of said at least two multifunctional amines comprises an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, or any combination thereof.

9. The curing agent of claim 6 further comprising at least one acid selected from the group consisting of acetic acid, lactic acid, salicylic acid, sebacic acid, sulfamic acid, boric acid, or combinations thereof.

10. The curing agent of claim 9 wherein the acid comprises sebacic acid.

11. The curing agent of claim 6 wherein the AHEW based on 100% solids is about 80 to about 125.

12. An amine-epoxy composition comprising the reaction product of a curing agent and an epoxy composition comprising at least one multifunctional epoxy resin;
   wherein the curing agent comprises the contact product of:
   (1) the reaction product of (A) at least one polyalkylene polyether polyol modified polyepoxide resin and (B) at least one polyalkyleneamine;
   (2) at least one multifunctional amine having 2 or more active amine hydrogens; and
   (3) a carboxylic acid;
   wherein the stoichiometric ratio of epoxy groups in the epoxy composition to amine hydrogens in the curing agent range from about 1.5:1 to about 0.7:1; and
   wherein the polyalkylene polyether polyol modified polyepoxide resin comprises alkoxylated diphenol epoxy resins having the following structure:

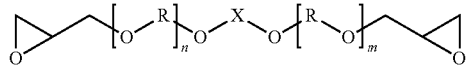

where X is an arylidene radical derived from a diphenol, R is a C2H4, C3H6 or C4H8 alkyl group, or mixture thereof, and n+m=1 to 20.

13. The amine-epoxy composition of claim 12, wherein the at least one polyalkyleneamine comprises 1-25 parts by weight of N-3-aminopropyl ethylenediamine (N3), 50-94 parts by weight N,N'-bis(3-aminopropyl)ethylenediamine (N4), and 3-25 parts by weight N,N,N'-tris(3-aminopropyl) ethylenediamine (N5).

14. The amine-epoxy composition of claim 12, wherein the at least one multifunctional amine comprises an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, or any combination thereof.

15. The amine-epoxy composition of claim 12, wherein the carboxylic acid is selected from the group consisting of acetic acid, lactic acid, salicylic acid, and sebacic acid.

16. The amine-epoxy composition of claim 12, wherein the at least one multifunctional epoxy resin comprises a diglycidyl ether of bisphenol-A (DGEBA), an advanced or higher molecular weight version of DGEBA, a diglycidyl ether of bisphenol-F, an epoxy novolac resin, or any combination thereof.

17. A composition comprising: epoxy resin, polyamine epoxy adduct curing agent, filler, and water; wherein the polyamine epoxy adduct curing agent comprises the reaction product of:
(A) at least one polyalkylene polyether polyol modified polyepoxide resin; and
(B) a polyalkyleneamine composition comprising a mixture of N-3-aminopropyl ethylenediamine (N3), N,N'-bis(3-aminopropyl)ethylenediamine (N4), and N,N,N'-tris(3-aminopropyl)ethylenediamine (N5).

18. The composition of claim 17 which is a tile grout composition comprising: 5 to 15 wt % epoxy resin, 5 to 15 wt % polyamine epoxy adduct curing agent, 50 to 85 wt % filler, and 2 to 20 wt % water, the amount of water based on total solids.

19. The composition of claim 17 which is a self-leveling flooring composition comprising: 10 to 20 wt % epoxy resin, 10 to 20 wt % polyamine epoxy adduct curing agent, 50 to 75 wt % filler, and 4 to 20 wt % water, the amount of water based on total solids.

20. A curing agent composition comprising the contact product of:
(1) the reaction product of (A) at least one polyalkylene polyether polyol modified polyepoxide resin and (B) at least one polyalkyleneamine; and
(2) at least one multifunctional amine having 2 or more active amine hydrogens;
wherein the at least one polyalkylene polyether polyol modified polyepoxide resin comprises alkoxylated diphenol epoxy resins having the following structure:

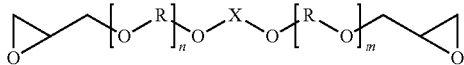

where X is an arylidene radical derived from a diphenol, R is a C2H4, C3H6 or C4H8 alkyl group, or mixture thereof, and n+m=1 to 20.

21. An amine-epoxy composition comprising the reaction product of a curing agent and an epoxy composition comprising at least one multifunctional epoxy resin;
wherein the curing agent comprises the contact product of:
(1) the reaction product of (A) at least one polyalkylene polyether polyol modified polyepoxide resin and (B) at least one polyalkyleneamine; and
(2) at least one multifunctional amine having 2 or more active amine hydrogens;
wherein the at least one polyalkylene polyether polyol modified polyepoxide resin comprises alkoxylated diphenol epoxy resins having the following structure:

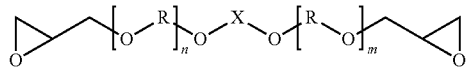

where X is an arylidene radical derived from a diphenol, R is a C2H4, C3H6 or C4H8 alkyl group, or mixture thereof, and n+m=1 to 20.

22. An amine-epoxy composition comprising the reaction product of a curing agent and an epoxy composition comprising at least one multifunctional epoxy resin;
wherein the curing agent comprises the contact product of:
(1) the reaction product of (A) at least one polyalkylene polyether polyol modified polyepoxide resin and (B) at least one polyalkyleneamine;
(2) at least one multifunctional amine having 2 or more active amine hydrogens; and
(3) a carboxylic acid;
wherein the at least one polyalkylene polyether polyol modified polyepoxide resin comprises: (A1) an alkoxylated diphenol epoxy resin have the following structure:

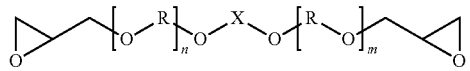

where X is an arylidene radical derived from a diphenol, R is a C2H4, C3H6 or C4H8 alkyl group, or mixture thereof, and n+m=1 to 20; or (A2) the reaction product of: a polyepoxide compound which is a diglycidyl ether of bisphenol A, a diglycidyl ether of bisphenol F, or a combination thereof; and a polyalkylene polyether polyol which is a polyethylene glycol, a polypropylene glycol, or a combination thereof;
wherein the at least one polyalkyleneamine comprises a mixture of 1-10 parts by weight of N-3-aminopropyl ethylenediamine (N3), 70-94 parts by weight N,N'-bis(3-aminopropyl)ethylenediamine (N4), and 3-15 parts by weight N,N,N'-tris(3-aminopropyl)ethylenediamine (N5); and
wherein the at least one multifunctional epoxy resin comprises a diglycidyl ether of bisphenol-A (DGEBA), an advanced or higher molecular weight version of DGEBA, a diglycidyl ether of bisphenol-F, an epoxy novolac resin, or any combination thereof.

* * * * *